United States Patent [19]

Kehr et al.

[11] 4,234,439
[45] Nov. 18, 1980

[54] DIELECTRIC MATERIAL FOR INFLUENCING ELECTRIC FIELDS, AND STRESS CONTROL DEVICES MADE THEREFROM

[75] Inventors: Dieter Kehr; Juergen Goebell, both of Hamburg, Fed. Rep. of Germany

[73] Assignee: Minnesota Mining and Manufacturing Company, St. Paul, Minn.

[21] Appl. No.: 37,669

[22] Filed: May 10, 1979

[30] Foreign Application Priority Data

May 12, 1978 [DE] Fed. Rep. of Germany ....... 2821017

[51] Int. Cl.³ .................... H02G 15/02; H02G 15/08; H01B 17/64; H01B 3/04
[52] U.S. Cl. .............................. 252/63.2; 174/73 R; 252/63.5
[58] Field of Search .................... 174/73 R, 73 SC; 252/63.2, 63.5, 512

[56] References Cited

U.S. PATENT DOCUMENTS

| | | | |
|---|---|---|---|
| 3,349,164 | 10/1967 | Wyatt | 174/73 R |
| 3,515,798 | 6/1970 | Sievert | 174/84 R X |
| 3,585,274 | 6/1971 | Tomaszewski et al. | 174/73 R |
| 3,823,334 | 7/1974 | Pailofsky et al. | 174/73 R X |
| 4,053,702 | 10/1977 | Erickson et al. | 174/73 R |

Primary Examiner—Harris A. Pitlick
Attorney, Agent, or Firm—Cruzan Alexander; Donald M. Sell; Gerald F. Chernivec

[57] ABSTRACT

A dielectric composition for influencing electric fields comprising a dielectric base material having electrically conductive and electrically insulating platelet-shaped particles and stress control devices made therefrom.

8 Claims, 4 Drawing Figures

DIELECTRIC MATERIAL FOR INFLUENCING ELECTRIC FIELDS, AND STRESS CONTROL DEVICES MADE THEREFROM

BACKGROUND OF THE INVENTION

The invention relates to a dielectric material for influencing electric fields, a method for preparing such material, and stress control devices, and particularly stress control elements, manufactured utilizing that material.

In electrical installations for medium and high voltage, i.e., from about 10 kV, high potential gradients may occur in areas where the radial field has discontinuities due to changes in the field borders at the locations which are under voltage and which are separated by a dielectric. In such areas, overburdening of the dielectric can easily occur due to field amplification and densification which the dielectric cannot withstand. Terminations, angular plugs, connecting plugs or other connecting elements of shielded high voltage cables are considered as typical examples of such locations; there, the electric field which exists between the exposed end of the conductor and the end of the shield concentrates in the areas close to the shield, such that there is a danger in those areas that the breakdown voltage of the cable insulation and/or the adjacent air layers may be exceeded.

That danger is increased by the fact that in practice, the transmission of electrical energy deals almost exclusively with alternating voltages in which the dielectric losses in dielectric materials can cause rather substantial temperature increases. Such increases in turn normally result in an increase of the dielectric losses so that eventually an accumulation of the factors which stress the dielectric may exceed the dielectric load capability. It is known to counteract this phenomena and resultant dangers by arranging, in the endangered areas, materials or shaped bodies of various geometric design made therefrom, which due to particular properties, e.g. a resistivity which decreases with the potential gradient (U.S. Pat. No. 2,666,876) or a high permittivity (dielectric constant) of e.g. more than 20 (U.S. Pat. No. 4,053,702), are capable of influencing the electric field to make it more uniform. Such materials typically consist of an electrically insulating base material, particularly an elastomeric plastic, with particles embedded therein which give the material the desired properties.

In the case of voltage-dependent resistivity, for example, particles of a semi-conductive material, e.g. silicium carbide, or metal particles may be embedded in the material. In the case of materials exhibiting a high dielectric constant, it is typical to insert particles of a material having a high dielectric constant, for example barium titanate or titanium oxide.

Furthermore, it is known to influence the field distribution in endangered areas in a capacitive manner by arranging metallic electrodes correspondingly. For example, alternate layers of conductive and insulating foil may be wrapped about a cable termination (U.S. Pat. No. 2,276,923), or a sleeve-shaped stress control element which includes annular electrodes (U.S. Pat. No. 3,673,305) may be placed around the cable termination. Still further, deflectors are known for influencing the field distribution capacitively, which comprise a conductive outer portion of elastic material, and a highly insulating elastic interior portion which is gap-free, connected thereto (U.S. Pat. Nos. 3,243,756 and 3,344,391; German Pat. No. 1,465,493).

The above-described known possibilities for providing resistive, refractive or capacitive field control have some disadvantages, even when applied in combination. The embedding of particles of a material having a high permittivity (dielectric constant) normally increases the dielectric losses considerably. The heating caused thereby in turn increase the tendency of thermal decomposition or premature aging of the insulating materials and thus can lead to thermal break-throughs. In the capacitive field control, the edges of the electrodes form strong discontinuities so that the edges must be arranged in areas having little stress, and thus the field control device as a whole must be dimensioned correspondingly large. It has also been found in the application of conical deflectors on cable terminations that between the cone and the parts of the cable termination, small cavities are likely to occur which are highly undesirable because of their unfavorable influence on the electrical field intensity along the deflector casing. Furthermore, there is the danger that proper positioning of such cones cannot always be ensured.

Finally, another solution of the above-described problems has become known, which offers considerable advantages over the above-described known countermeasures. According to that solution, a material is used for influencing electrical fields which comprises a dielectric base material and a conductive material which is finely distributed therein and consists of platelet-like particles of an electrically conductive substance, particularly metal, the platelets being oriented substantially parallel with each other so that when measuring the dielectric constant, different values are obtained when the measuring electrode arrangement used is applied parallel to or perpendicular to the platelet planes (U.S. Pat. No. 3,349,164). As a base material, preferably an easily workable, particularly pourable or die-castable material is used, which also may be resilient and/or temperature resistant and/or weather-proof, if desired. Examples of such materials include polyvinyl chloride in hard or softened forms, butadiene-acrylonitrile elastomers, and the like. Conductive particles such as carbon black, and filler substances may be added; however, the particle size thereof is considerably smaller than that of the electrically conductive platelets. The material is used either in the form of a wrapping band containing the material, or as a pastable or pasty suspension.

In the case of cable terminations, protective coatings are typically prepared at the application site by wrapping around the band, or applying multiple coatings of the suspension. The desired parallel orientation of the conductive platelets is effected in the manufacture of the band by calendering or by the brushing process in the case of painting with the suspension. The material has been found to be very useful in practice. It has low losses and is insignificantly influenced by possible air inclusions. The mode of function is basically capacitive, i.e., homogenization of the field is obtained through the orientation of the conductive particles together with the relatively high permittivity of the base material.

In practice, however, the wrapping-around of a band, or the brushing-on of a paste is frequently difficult, and in any case is troublesome. Furthermore, coatings made in this manner are strongly dependent on the skill of the respective worker with regard to their geometry and their electrical properties.

It has also been proposed to manufacture prefabricated elastic shaped bodies from materials in which particles of a platelet-shaped conductive material are embedded in a dielectric base material (U.S. Pat. No. 3,515,798), as it was known in the case of materials having embedded particles of insulating material of high permittivity (U.S. Pat. Nos. 3,823,334 and 4,053,702). In practice, however, such has not been followed because the orientation of the platelets of conductive material, which was desired and was considered indispensable, could not be obtained in a simple manner in the manufacture of such shaped bodies. More particularly, however, it has been found that the range of application of the above-described material with embedded parallel-oriented particles of conductive material was limited toward high operating voltages. Still further, the breakthrough voltage decreases strongly with increasing content of conductive platelets. On the other hand, however, it appeared desirable to take advantage of the favorable properties of the described known material with embedded particles of conductive material also in electrical installations with high operating voltages.

SUMMARY OF THE INVENTION

It is the object of the invention to provide a composition which is suitable for influencing, and, more particularly, equalizing electric fields at low losses in medium and high voltage installations, which is easily prepared, makes possible, even with the application of small amounts, a highly effective electrical relief of endangered areas, is useful at high operating voltages, and moreover may be easily worked to form resilient shaped bodies.

According to the invention, that object is achieved with a dielectric material for influencing electric fields comprising a dielectric base material wich preferably is easily workable, particularly pourable or die-castable, and, if desired, resilient and temperature-resistant and/or weather-resistant and/or of good heat conductivity, and a finely distributed conductive material of platelet-shaped particles of a substance having good electrical conductivity, particularly metal like aluminum, in an amount below a limit concentration at which the material still has an electrical volume resistivity as is characteristic for insulating materials. Such material according to the invention also contains an insulating material which is different from the base material and has a higher electrical breakdown voltage than the base material, in finely distributed form as platelet-shaped particles, particularly of mica, which according to number and size are comparable with the platelet-shaped particles of the conductive material.

It has been found that the composition according to the invention illustrates all the advantages of the known material having embedded platelets of conductive material, and moreover offers, under comparable conditions of application, an appreciably increased safety against glow phenomena, flash-overs, and breakdown, even at high operating voltages and/or with relatively considerable contents of conductive material therein. Surprising and particularly advantageous is the fact that the material shows the highly advantageous properties particularly in cases where its permittivity is set to relatively low values, particularly up to 8, by a corresponding selection of the base material and the embedded insulating material. Then, the dielectric losses are particularly low.

DETAILED DESCRIPTION OF THE INVENTION

Figure 1:
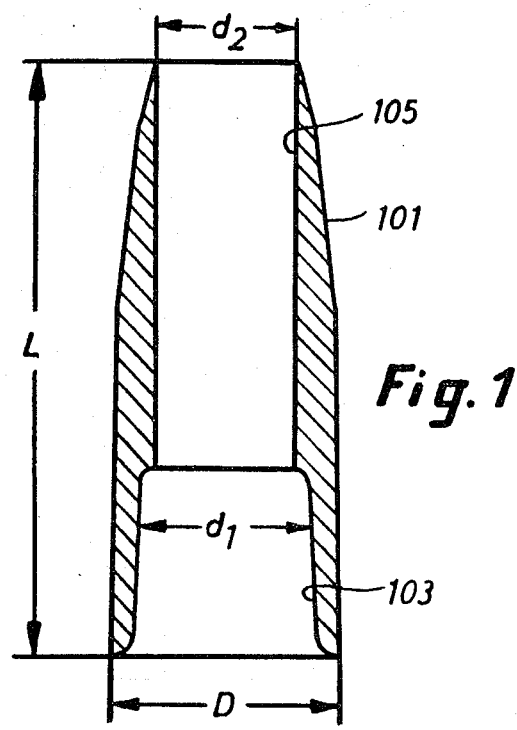

When applied at terminations or other connecting elements of shielded high voltage cables, a breakthrough safety is observed which is increased by about 50%, as compared to known insulating materials for field control devices with comparable dimensions. Even when applying high weight concentrations of conductive material, e.g. up to about 30 percent by weight aluminum platelets, which give the material a correspondingly high effectiveness for the field control, the electric volume resistivity remains at values which are typical for good insulating materials, in any case at values above $10^{10}$ Ohm·cm.

The amounts and particle sizes of the insulating material naturally are in similar ranges. Often, the concentration of embedded platelet-shaped insulating material may be as high as 60 percent by weight, an upper limit being due to possible undesirable changes in the mechanical properties of the material.

The reason for the surprisingly advantageous properties of the material probably is due to the fact that the platelets of insulating material intersperse between the platelets of conductive material and effect a particularly high mutual electrical insulating of the platelets of conductive material. The concentration of electrically conductive bridges between a plurality of successive platelets of conductive material is thereby strongly reduced. This results in a more homogeneous structure of the material, and a larger total length of the electrical field lines which extend along curved paths between the platelets of conductive material. It is particularly surprising that the advantages of the composition are obtained without the platelets having a preferred orientation, i.e., when the platelet-shaped particles are contained with an essentially random-distributed orientation of their platelet plates. Thus, the composition or shaped bodies consisting thereof can be manufactured without the application of orienting working steps like calendering or the like, e.g. by simple casting or die-casting. This simplifies the manufacture and enlarges the range of possible applications.

It has been found that it is favorable for the dielectric properties of the material, particularly the flash-over safety obtained therewith, if the embedded insulating material used has a permittivity which is at least equal to that of the base material. Generally, good properties are obtained if the base material and the insulating material each have a permittivity below 10.

The size of the conductive platelets is of importance for the obtained homogeneity of the composition in relation to the dimensions of the structural parts which are used at and in the composition in the particular case of application. With the dimensions and flash-over distances for alternating voltages from about 15 kV, the platelets of the conductive material may have a transverse dimension, measured transverse of their thickness, of about 5 to 75 μm; an advantageous intermediate range is 10 to 25 μm. The thickness of the platelet-shaped particles should be no more than about 1/10 of the transverse dimension to retain the character of a platelet.

Of course, similar considerations hold also for the platelets of insulating material. The transverse dimensions thereof preferably should be in the same order of magnitude, particularly about 15 to 75 μm, preferably between about 20 and 40 μm. Normally it is difficult to purchase insulating material in platelet-shaped particles of very small transverse dimensions. A particularly suitable insulating material is mica which according to its nature has platelet structure.

The composition of the invention may be prepared in a very simple manner by:

(a) preparing a pasty or fluid or die-castable material by mixing the conductive material with a base compound which is capable of being hardened or cured to form the dielectric base material, (b) bringing the platelet-shaped insulating material additionally into the base compound, (c) forming a parison from the prepared material compound, and (d) hardening or curing the parison.

The expression "hardening" in this context shall include any process which provides solidification from a pasty, flowable or die-castable condition, particularly the curing or solidification of plastics which are capable of polyaddition or poly condensation, the drying of solvent-containing compounds, the solidification of molten compounds, vulcanization, the thermal setting of plastics, and the like.

A particularly simple mode of preparation for the composition is to form a premix of the conductive material and the insulating material, following which the premix is mixed with the base compound.

In order to ensure and improve the mutual electrical insulation of the particles of conductive material, it may be recommendable to prepare a premix from the conductive material and a liquid electrically insulating auxiliary substance which is compatible with the base material, and to then further process the premix and the insulating material with the base compound to form the inventive composition. As an electrically insulating auxiliary compound, a disperging agent for the conductive material may be advantageously used. Often, it is also possible to use as an auxiliary substance a plastisizing and/or curing and/or catalyzing agent which is compatible with the base material. That agent moreover may act as a disperging agent for the conductive material. This means in practice that in many cases the constituents which are per se required to obtain the desirable properties of the base material may also function as the electrically insulating auxiliary substance.

The composition of the invention can be processed and worked, depending upon the nature of the constituents selected, to shaped bodies having a definite configuration, or also as an amorphous or thixotropic mass which particularly may be capable of being brushed-on, poured or die-cast.

Dielectric stress control devices can be manufactured which are designed with respect to their dielectric properties and their geometric configurations in accordance with desirable modifications of an electric field present at the respective site of application. These stress control devices consist at least partly of the composition of the invention. The manufacture of the stress control device is not difficult because orienting working procedures are not required. Particularly useful is a dielectric stress control element which consists of a shaped body, preferably a sleeve, which can be resiliently shifted onto an end of a cable insulation and/or shield. In such a case, it is possible to design the sleeve so that it includes an annular constituent of electrically conductive resilient material. This often is desirable to establish a well-defined potential at the end of the stress control element. Particularly, the annular constituent may be arranged at an end of the sleeve so that upon shifting the element on the end of a cable shield, electrical contact with the shield is established.

In many cases, stress control elements having other geometric configurations may be useful to prevent unacceptably high local field concentrations, for example in break elbows, transition or throughgoing connections, feed throughs and branchings of high tension cables.

It is particularly advantageous and therefore preferred, that the composition have elastomeric properties. Accordingly, dielectric stress control devices may be manufactured which are suited for different dimensions or sizes of electrical structural components. For example in the case of sleeves, same may have sufficient resilience to be applicable with cable insulations and/or dimensions of various thicknesses.

Figure 2:
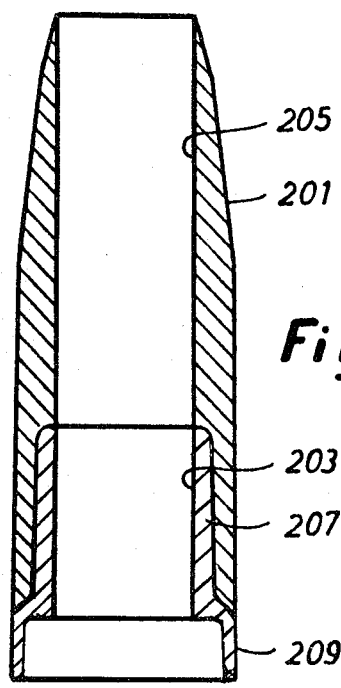
Figure 3:
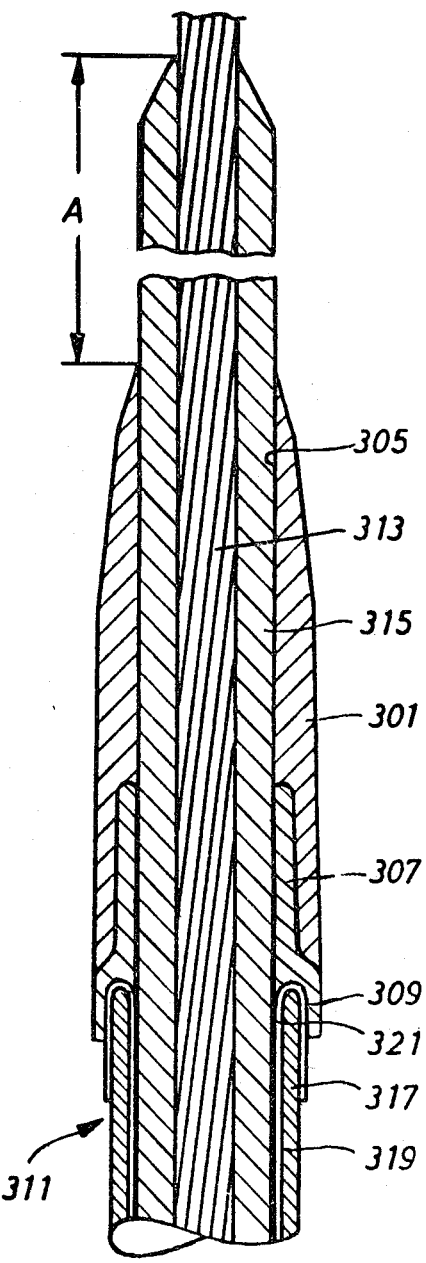
Figure 4:
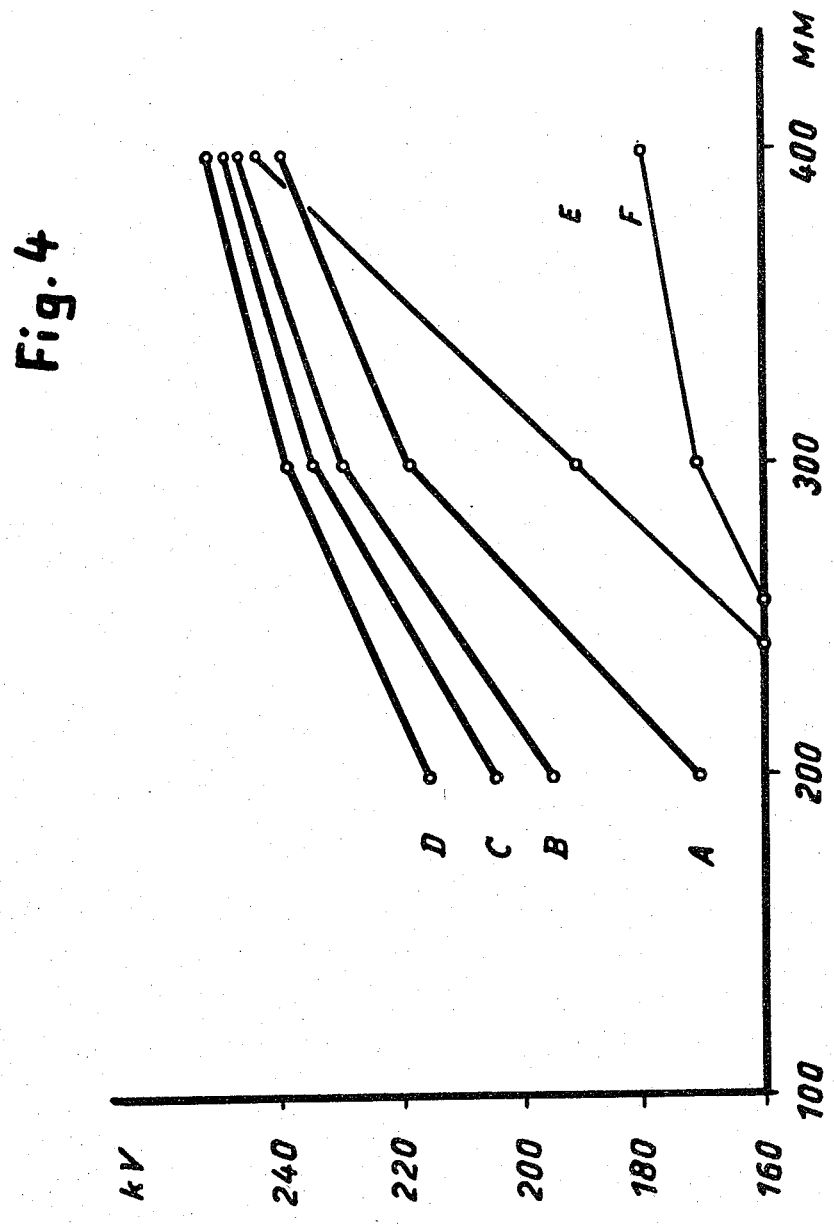

The invention will now be more particularly described by means of examples and test results in connection with the drawings. All features which distinguish over the prior art may be essential for the invention. In the drawings:

FIG. 1 is an axial section through a sleeve-shaped stress control element according to the invention, FIG. 2 is an axial section through another embodiment of a stress control element according to the invention, FIG. 3 is a sectional view of a cable termination having a stress control element according to the invention, and FIG. 4 is a graphical representation of the 50% flash-over pulse voltage versus the flash-over distance, i.e., the distance between an exposed end of the conductor of a shielded cable and the shield at a cable termination, including stress control elements according to FIG. 3, made from materials of various compositions.

In FIGS. 1 to 3, three digit reference numerals are used wherein the first digit designates the figure, and the second and third digits designate the respective part.

FIG. 1 illustrates an axial section of a sleeve-shaped stress control element destined to be shifted upon an end of a shielded high voltage cable. It consists of a unitary sleeve body 101 of resilient material of the kind described. At one end, the sleeve body has a cylindrical recess 103 having a diameter $d_1$, which extends toward the other end into a passage 105 having a constant smaller diameter $d_2$. Approximately from the mid of its length L, the outer diameter D of the sleeve body 101 continuously decreases toward the interior diameter $d_2$ of the passage 105.

FIG. 2 illustrates an axial section of a sleeve-shaped stress control element comprising a sleeve body 201 which is equal to the sleeve body of the element according to FIG. 1. In the recess 203, a sleeve-shaped insert body 207 of electrically conductive or semi-conductive resilient material is inserted in a gap-free manner, particularly by vulcanization, the insert body having at the end which is remote from the passage 205 an outwardly cranked sleeve-shaped skirt 209 extending beyond the end of the sleeve body 201.

In case the sleeve body 201 consists of silicon rubber, conductive silicon rubber of the type "Conductive Rubber Silastic Q 41602" supplied by the Dow Corning company may be used as the base material for the manufacture of the sleeve-shaped insert body 207. It may be added at a weight ratio of 50:50 to an organosiloxane such as "Silastic 133 BU" of the Dow Corning company, and crosslinked with a suitable catalyst, e.g. "Catalyst B" of the Dow Corning company, at 140° C. (10 minutes). The product so obtained has a specific volume resistivity of 80 to 100Ω·cm.

FIG. 3 ilustrates an axial section of a sleeve-shaped stress control element of the kind shown in FIG. 2, operatively shifted onto an end of a shielded high voltage cable 311. The cable conventionally consists of a conductor 313, a dielectric insulation 315 surrounding the conductor, a cable sheath which may also consist of insulating material and is interiorly and exteriorly provided with a metal shielding 319, and a radiation protection layer 321 of semi-conductive material. At the illustrated end of the cable, the sheath 317 is cut away. Onto the thus-exposed end of the insulation 315, the stress control element 301 has been shifted into place under elastic expansion to obtain a tight fit so that the cable insulation 315 extends through the passage 305 without any gap, if necessary utilizing a pasty filler mass like silicon grease to avoid air inclusions, and the electrically conductive or semi-conductive insert body 307 is electrically connected to the metal shield 319. The electrical contact is improved in that the skirt 309 of the insert body 307 tightly fits around the outer layer of the metal shield 319. Outside of the other end of the stress control element 301 the cable insulation 315 is removed after a set-off length A so that the conductor 313 is exposed.

For the dielectric material, the following examples are given:

EXAMPLE 1

To 58 parts by weight of a branched polyalcohol having ether and ester groups and a hydroxyl content of about 5% (a suitable commercial product is "Desmophen" supplied by Bayer AG), are added 10 parts by weight of aluminum flake consisting of platelet-shaped particles having a mean transverse dimension of about 20 μm, and 10 parts by weight of mica powder consisting of platelet-shaped particles having a means transverse dimension of about 35 μm under stirring, and are homogeneously mixed with 22 parts by weight of diphenyl methane-4,-4'diisocyanate (MDI).

The composition may be easily formed to shaped bodies and forms a resilient material after curing.

EXAMPLE 2

10 Parts by weight aluminum flake and 20 parts by weight mica of the nature as described in Example 1 are added, with stirring, to a mixture of 17.4 parts by weight of a branched polyether of the kind stated in Example 1 and 30.6 parts by weight of a trifunctional polyalcohol (molecular weight 3000). After a homogeneous mixture has resulted, 22 parts by weight MDI (see Example 1) are added. This results in an easily moldable material compound which forms a resilient material after curing.

EXAMPLE 3

10 Parts by weight aluminum flake and 20 parts by weight mica of the nature described in Example 1 are homogeneously mixed with 64.64 parts by weight of a reactive organosiloxane, suitable commercial products being "Sylgard 184" of Dow Corning and "HTV 100/25" of the Wacker company, and thereafter, 6.36 parts by weight of a metal catalyst are added. An easily moldable compound is obtained which hardens to form a resilient material.

EXAMPLE 4

10 Parts by weight aluminum flake having a mean particle transverse dimension of 25 μm, 5 parts by weight mica having a mean particle transverse dimension of 35 μm are homogeneously intermixed on a masticizing cylinder with 84.2 parts by weight of a reactive organosiloxane of the type stated in Example 3. Thereafter, 0.8 part by weight dicumyl peroxide is added as a vulcanizing agent. An easily moldable compound is obtained which after 15 minutes of vulcanization at 165° C. forms a rubber-elastic material.

EXAMPLE 5

10 Parts by weight aluminum flake (platelet structure) and 5 parts by weight mica powder are added to 75.55 parts by weight of a OH group-containing polybutadiene (OH number 1.3, "Poly BD R45HT" supplied by Arco Chemical Comp.). After 0.01 parts by weight of dibutyl tin laurate have been added, the mixture obtained is reacted with 9.44 parts by weight of pure MDI (see Example 1) (NCO content=34%).

EXAMPLE 6

26.6 Parts by weight of an internally castor oil-plastified DGEBA (diglycide ether of bisphenol A) (a suitable commercial product being "Beckopox Spezialharz EP151" supplied by Hoechst AG, having an epoxy value of 0.22) are added to a mixture of 10 parts by weight of aluminum flake and 10 parts by weight of mica powder. For flexibilization, 26.66 parts by weight of a diglycide ether (a suitable commercial product being "LER 736" supplied by Dow Corning, having an epoxy value of 0.53), and 11.74 parts by weight of a liquid hydrocarbon resin (a suitable commercial product being "Epodil L" supplied by Anchor Chemical Comp., Ltd.) are added.

The mixture obtained is cured with 14.94 parts by weight of a modified polyamine having an amine equivalent of 70 (a suitable commercial product being "Beckopox Spezialhärter VEH 629" supplied by Hoechst AG).

EXAMPLE 7

61 Parts by weight of a nonylphenol-blocked isocyanate (prepolymer) (a suitable commercial product being "Desmocap 11" supplied by the Bayer company) are intermixed with 15.3 parts by weight of diundecyl phthalate (which is sold under the name "DUP" by the Monsanto company).

Subsequently, a mixture of 12.5 parts by weight aluminum flake and 7.5 parts by weight mica powder are added. The mixture obtained is crosslinked by means of a bifunctional aliphatic polyamine (amine equivalent 60, a suitable commercial product being "Laromin C260" of the BASF company).

The hardened materials obtained in accordance with Examples 1 to 7 have properties as listed in the following table I.

TABLE I

| Example | Volume Resistivity at Room Temperature Ohm . cm | Permittivity (Dielectric Constant) at the following Temperatures in °C. | | |
|---|---|---|---|---|
| | | 20 | 50 | 80 |
| 1 | $5 \cdot 10^{12}$ | 7.8 | 8.1 | 9.5 |
| 2 | $4 \cdot 10^{13}$ | 6.5 | 7.1 | 8.2 |
| 3 | $4 \cdot 10^{15}$ | 6.6 | 6.2 | 5.5 |
| 4 | $7 \cdot 10^{14}$ | 7.8 | 7.6 | 6.9 |

TABLE I-continued

| Example | Volume Resistivity at Room Temperature Ohm . cm | Permittivity (Dielectric Constant) at the following Temperatures in °C. | | |
|---|---|---|---|---|
| | | 20 | 50 | 80 |
| 5 | $4 \cdot 10^{13}$ | 4.6 | 5.3 | 6.3 |
| 6 | $2 \cdot 10^{12}$ | 6.5 | 7.2 | 8.1 |
| 7 | $1 \cdot 10^{11}$ | 7.1 | 7.9 | — |

The materials listed had electrical break-through voltages between 10 and 15 kV/mm.

From the compositions of Examples 1 to 4, shaped bodies according to FIG. 1 were molded and hardened to form resilient sleeve bodies. Additionally, further sleeve bodies were, for comparison purposes, prepared from materials which contained 10 percent by weight ("comparison E") and 5 percent by weight ("comparison 6"), respectively, aluminum flake of the kind stated in Example 1 but without platelet-shaped insulating material, and in other respects were composed as the material according to Example 1. The geometric dimensions in all cases were D=40 mm, $d_1$=30 mm, $d_2$=25 mm, L=90 mm. The sleeve bodies were provided with semi-conductive resilient insert bodies 207 according to FIG. 2, and the so-formed stress control elements were shifted onto an end of a shielded high voltage cable, as illustrated in FIG. 3. The shield 319 was grounded, and voltage pulses were applied to the conductor 313 in accordance with the prescriptions VDE 0472 § 511, the free end of the conductor being provided with a spherical electrode.

Tests were made with different set-off lengths A (FIG. 3) of the cable insulation. In every series of tests, eventually flash-overs eventually occurred between the exposed end of the conductor 313 and the end of the shield 319 when the pulse voltage was increased. The length of the flash-over distance is approximately equal to the structural length L of the stress control element, plus the set-off length A of the cable insulation. In every case, the "50% flash-over pulse voltage" was determined, i.e., the pulse voltage at which flash-overs occurred in 50% of the voltage pulses applied. In no case were break-throughs through the cable insulation 315 observed.

FIG. 4 illustrates the mean values of the test results in a graphical representation. It can be seen that the stress control elements having short structural lengths and small dimensions provide a high degree of safety against overvoltages as may for instance occur in energy transmitting systems by the influence of flashes. Corresponding tests with materials which were prepared as in Examples 1 to 4, however, with only 5 percent by weight aluminimum flake, showed results which were only slightly less advantageous.

What is claimed is:

1. A dielectric composition for influencing electric fields comprising a dielectric base material having distributed therein electrically conductive platelet-shaped particles in an amount below a limit concentration at which the composition exhibits an electrical volume resistivity characteristic for insulating materials, and also distributed therein platelet-shaped particles of an insulating material different from said base material and having a higher electrical breakdown voltage than said base material, the number and size of said particles of insulating material being comparable with said platelet-shaped electrically conductive particles.

2. The composition of claim 1, wherein said electrically conductive platelet-shaped particles are arranged in the base material with an essentially random-distributed orientation of their platelet planes.

3. The composition of claim 1 wherein said insulating material has a relative permittivity which is at least equal to that of the base material.

4. The composition of claim 1 wherein said base material and said insulating material each have a relative permittivity less than 10.

5. The composition of claim 1 wherein said insulating material comprises mica platelets in a concentration of from about 5 to about 60 percent by weight of said composition.

6. The composition of claim 1 wherein said conductive particles comprise aluminum platelets in a concentration of from about 5 to about 30 percent by weight of said composition.

7. The composition of claim 1 wherein said conductive platelet-shaped particles have a transverse dimension of about 5 to 75 μm when measured transverse of their thickness.

8. The composition of claim 1 wherein said platelet-shaped particles of insulating material have a transverse dimension of about 15 to 75 μm as measured transverse of their thickness.

* * * * *